INVENTOR.
George H. Wells
BY
John V. Regan
ATTORNEY

July 27, 1965 G. H. WELLS 3,197,719

IMPEDANCE MATCHING SOURCE TO LINE FOR PULSE FREQUENCIES WITHOUT ATTENUATING ZERO FREQUENCY

Filed Feb. 13, 1961 2 Sheets-Sheet 2

INVENTOR.
George H. Wells
BY John V. Regan
ATTORNEY

United States Patent Office 3,197,719
Patented July 27, 1965

3,197,719

IMPEDANCE MATCHING SOURCE TO LINE FOR PULSE FREQUENCIES WITHOUT ATTENUATING ZERO FREQUENCY

George H. Wells, Westmont, N.J., assignor to Radio Corporation of America, a corporation of Delaware Filed Feb. 13, 1961, Ser. No. 89,034
13 Claims. (Cl. 333—33)

This application deals with transmission lines and is directed particularly to the problem of transmitting a direct current level with a very steep leading edge along a line which is badly mismatched at both its sending and receiving ends. This problem is a very serious one in the transmission of digital data among the logic, memory and other stages of a high speed digital computer.

The problem above is solved according to the present invention by a matching device placed in series with the line which has substantially zero impedance with respect to direct current but which looks to the higher frequency components of the steep leading edge of the direct current level like an impedance approximately equal to the line impedance.

The invention is described in greater detail below and is illustrated in the following drawing of which:

Figure 1:
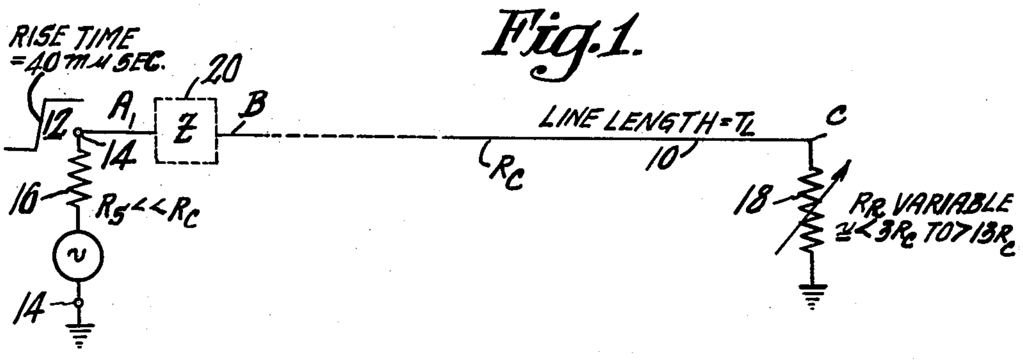
FIG. 1 is a schematic circuit diagram to help explain the problem dealt with in the present invention.

FIG. 1 shows a transmission line 10 along which it is desired to transmit a direct current level having a steep leading edge such as illustrated at 12. The line length is expressed as a time delay $T_L$, that is, the time required for an input signal applied to the input (sending) end of the line to reach the remote (receiving) end of the line. The driver, that is, the voltage generator stage applying the wave 12 to input terminals 14 has a very low impedance looking from the transmission line into the driver. This impedance is represented in FIG. 1 by resistor 16. The transmission line output is applied to a number of circuits in parallel. The impedance of each of the circuits is much, much higher than the line impedance and, even when all of the circuits conduct, the impedance looking from the line into all of the circuits is still substantially higher than the line impedance. This line terminating impedance is represented in FIG. 1 by variable resistor 18. As examples of the various impedances involved, the characteristic impedance of line 10 may be 75 ohms or so. The input impedance to the line may be a few ohms—substantially a short circuit. The output impedance of the line is a value somewhere between perhaps 200 ohms (when all of the stages fed by the line conduct) and 1,000 ohms (when only one of the stages driven by the line conducts).

The circuit above should be capable of applying as much of the driver signal 12 as possible to the load 18 terminating the line. In other words, it is important that there be very little loss in the signal path between the sending and receiving ends of the line. It would be advantageous from this point of view, to be able to operate the line without employing an impedance matching means. The reason is that the impedance matching means itself dissipates power which would otherwise be available to drive the load. However, without an impedance matching means, there are multiple reflections of the steep leading edge of the direct current level 12 from both ends of the line. These appear as the ringing oscillation shown in FIGS. 2–2 and 2–3, where B is the wave present at the input end of the line and C is the wave present at the receiving end of the line. (The voltage level at B is relatively low in view of the low value of the line terminating impedance 16, however, is shown in enlarged scale in the drawing.) The ringing cannot be tolerated as it produces spurious responses.

Figure 2:
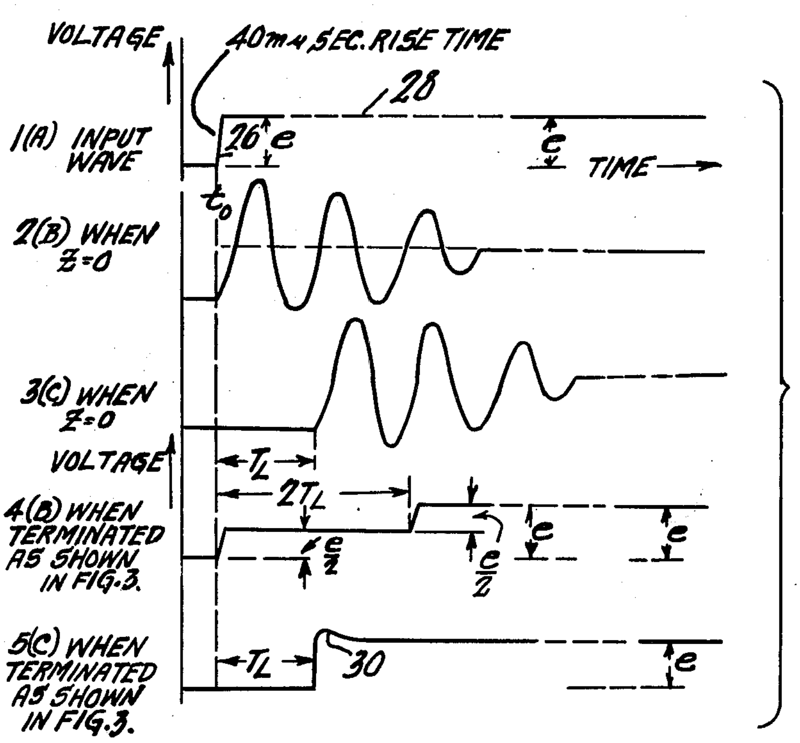
FIG. 2 is a drawing of waveforms present at various places in the circuit of FIGS. 1 and 3.

One possible solution to the problem above is to employ an impedance matching section Z at the input end to the line, shown as dashed block 20 in FIG. 1. This impedance matching section may be a series resistor having a value equal to the characteristic impedance of the line. This works well as far as reflections are concerned. The steep fronted wave 12 goes down the line, see an open circuit at the far or receiving end, and is reflected back toward the sending end of the line. However, looking from the line into the sending end, the reflected wave sees substantially the characteristic impedance of the line and is not reflected again. Unfortunately, this solution is not practical for the problem at hand. Although the series resistor provides an alternating current impedance match to the alternating components of wave 12 (the steep leading edge), it also dissipates a portion of the direct current it is desired to transmit to the load. In the worst case, that is, when the terminating resistance 18 is of the order of 200 ohms, the direct voltage drop across a 75 ohm matching resistor represented by block 20 is $$\frac{75}{200+75}(e)\cong .27e$$

where the line impedance is 75 ohms and $e$ is the direct current voltage level of the input wave (see FIG. 2–1). In other words, more than one quarter of the voltage available at the input terminals 14 appears across the impedance matching section 20 rather than across the load.

It might be mentioned that under the conditions above, the line is not too bady mismatched at its receiving end and possibly the matching device 20 could be eliminated entirely without ringing of too excessive a nature. However, if the matching device were eliminated, there would be severe ringing under other terminating conditions as, for example, when the terminating impedance 18 is much higher.

It might also be mentioned that if the terminating impedance is very high, then the resistor alone as a matching section is suitable. For example, if the impedance terminating the line is 1,000 ohms, then the voltage drop across a matching resistor is only $$\frac{75\Omega}{1075\Omega}(e)\cong .07e$$

However, as already discussed, the use of a resistor alone entails too great a loss when the line terminating impedance is lower. Thus, the circuit designer is on the horns of a dilemma in that a solution to the transmission problem which is satisfactory under one set of conditions becomes wholly unsatisfactory under another. The changing nature of the load, which may be different from one transmission period to another, only microseconds apart, is the complicating factor.

Figures 3, 4:
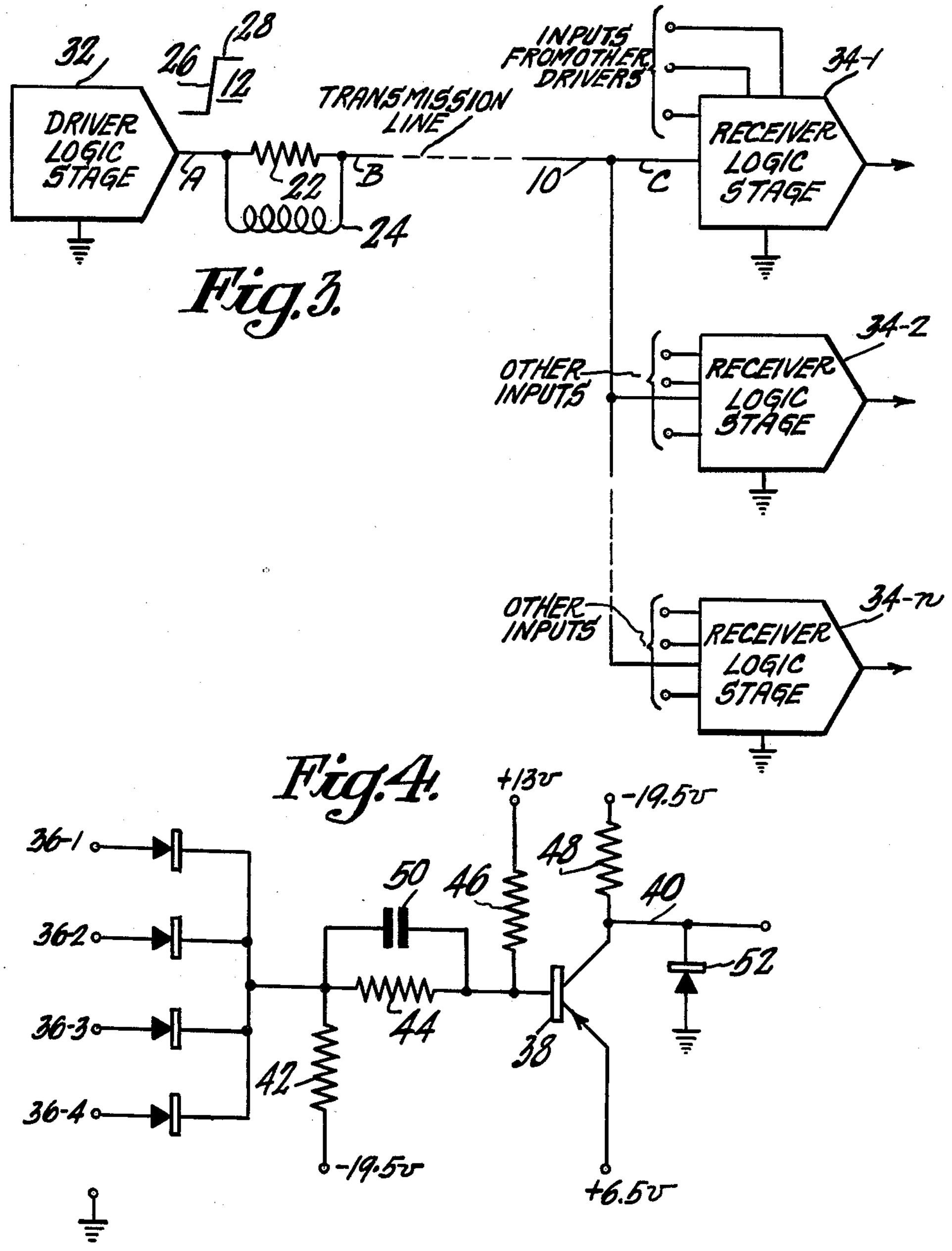
FIG. 3 is a block and schematic circuit diagram showing an embodiment of the present invention.
FIG. 4 is a schematic circuit diagram of the driver and logic stages of the circuit of FIG. 3.

The circuit shown in FIG. 3 solves the problem discussed above regardless of the terminating impedance. The matching section consists of a resistor 22 which is shunted by an inductor 24. The resistance is chosen to be of slightly larger value than the line impedance. The inductance is chosen so that the time constant L/R of the combination 22, 24 is about equal to or somewhat longer than twice the delay imparted by the delay line ($>2T_L$), or equal to or somewhat greater than the rise time of the direct current level, whichever is larger.

In operation, the wave 12 travels from the input end of the line, down the line to the far end. There, the line is mismatched in an impedance which is substantially higher than the line impedance. Accordingly, the wave is reflected back toward the matching section 22, 24. The matching section looks to the higher frequency components of the steep-fronted portion of the wave (those mainly responsible for the reflections) like an impedance which is approximately equal to the line impedance. Therefore, during the rise time (the steep leading edge) there is no further reflection of the input wave from the impedance matching section. After the full rise time of the wave, the wave 12 appears like a direct current. So far as this direct current component 28 of the input wave 12 is concerned, the inductance 24 looks like substantially a short circuit across the resistor 22. Thus, at the far end of the line, substantially the entire input voltage $e$ is available to drive the following stages.

Following is a specific example of a design employed in one particular computer application. The line imparted a round trip delay of about 55 millimicroseconds. Its impedance was 75 ohms. The resistor 22 was made 82 ohms and the inductance 24, 4.7 microhenries. The L/R time constant of 22, 24 is roughly 58 millimicroseconds which is slightly longer than twice the delay (55 millimicroseconds) imparted by the transmission line.

It can be shown that at a frequency roughly equal to the second harmonic (6 megacycles) of the fundamental frequency component of the steep leading edge of the wave 12, the matching section alternating current impedance is equal to the line impedance—a perfect match. (The frequency components of the wave can be determined by Fourier analysis.) At the higher frequency components, the impedance presented by the inductance 24 increases so that the impedance presented by the matching section also increases somewhat. However, as the resistor and inductance are in parallel, the change in impedance is not very great. For the very highest frequency component, the A.C. impedance of the matching section may be somewhat less in value than the resistance of resistor 22—82 ohms. This is still a good match to the 75 ohm line. For frequencies less than this and somewhat higher than the fundamental frequency, the A.C. impedance of the matching section is closer to 75 ohms, also a very good match to the line. At the fundamental frequency (about 3 megacycles) the impedance of the matching section has a value somewhat lower than 75 ohms (actually about 60 ohms) but is still sufficiently close to 75 ohms that the line is fairly well matched.

To summarize, at the second harmonic and higher frequencies, the matching section impedance is within 10% or so of the line impedance. At the fundamental, the matching section is still within about 20% of the line impedance. This is still a fairly good impedance match. Moreover, at this lower frequency, the rise time is long and accordingly this frequency component does not play as important a part in the reflections as the higher frequency components.

The waveforms present at various places in the circuit of FIG. 3 are shown in FIG. 2. Waveform 1 is the input wave. Waveform 4 is present at B (FIGS. 1 and 3). Note that slightly after time $t_0$, the voltage level is $e/2$ and after a period equal to twice the delay imparted by the transmission line, the voltage level comes up to $e$. The voltage available at the far end (receiving end) of the line is shown at 5 in FIG. 2. The steep leading edge arrives at the far end after a time equal to the delay $T_L$ imparted by the transmission line. There is a slight amount of overshoot at 30 due to the inductance, however, this is tolerated by the stages driven.

The remainder of FIG. 3 is shown in block form. It includes a driver logic stage 32 which, for example, may be a transistorized "and" gate or "nor" gate, or other logic stage. The receiving end of the line is terminated by a number of receiver logic stages 34–1 through 34–$n$. These, too, can be "and" or "nor" or other logic gates. Each stage, in these cases, receives inputs from other drivers. Four inputs are shown for each logic stage.

In the case in which all stages shown are "nor" gates, when all of the inputs to a stage are low D.C. voltage levels, representing the binary digit "zero," then that stage conducts and the impedance it presents to the transmission line is some value such as 1,000 ohms, for example. When one or more of the inputs to a stage is a high voltage level representing the binary digit "one," then that stage does not conduct and it looks to the transmission line like a higher value of impedance, such as 5,000 or more ohms.

A typical "nor" or "none" gate for stages 32 and 34 is shown in FIG. 4. There are four input terminals 36–1 to 36–4, and a diode in series with each input terminal. In the operation of the circuit of FIG. 4, when one or more of the inputs represents the binary digit "one" (a voltage of $+e$), then the output of the circuit represents the binary digit "zero" (slightly below ground), and when all of the inputs represent the binary digit "zero," then the output represents the binary digit "one." Assume that a binary "one" is applied to one of the input terminals to start with. This makes the diode in series with that terminal conduct and the conducting path is shunted across resistor 42 leading to the negative biasing source −19.5 volts. A positive voltage develops across resistor 44 of the voltage divider 46, 44, and transistor 38 is reverse biased and cuts off. The diode 52 connected between the collector and ground clamps the collector at slightly below ground voltage—binary "zero." When all of the inputs to 36–1 through 36–4 are binary "zero," the voltage drop across the voltage divider consisting of resistors 42, 44 and 46 is such that the base of the transistor is negative (forward biased). This causes the transistor to conduct and the collector goes positive to the extent of approximately +6 volts. This represents the binary digit "one."

A practical circuit according to FIG. 4 may have the values of D.C. voltages indicated and the following values of resistances and other components.

| | |
|---|---|
| Resistor 42 | 5,600 ohms. |
| Resistor 44 | 1,800 ohms. |
| Resistor 46 | 5,100 ohms. |
| Resistor 48 | 1,800 ohms. |
| Capacitor 50 | 240 micro-microfarads. |

It can easily be seen that the output impedance of the circuit of FIG. 4 is quite low and in practice may be several ohms (about 5–10 ohms). The alternating current input impedance to the circuit of FIG. 4 depends on the frequency and the values of resistances, capacitances and inductances effectively seen at the input terminals. It has been empirically determined that the effective value of this impedance for the circuit values given is about a thousand ohms for the higher frequency components of the input wave. This can also be shown in a rough way mathematically, however, the effects of capacitor 50 and of distributed impedance parameters are difficult to calculate accurately.

For a 75 ohm coaxial line, the matching section 22, 24 may have the following values.

| | |
|---|---|
| Resistor 22 | 82 ohms. |
| Inductance 24 | 4.7 microphenries. |

The present invention is not limited to a coaxial line. The line may be an open wire twisted pair, a shielded wire, and so on. Moreover, the invention is not limited to "nor" gates such as shown in FIG. 4, but is applicable to any type of driving unit and any type of receiving unit which, when operating, mis-match a transmission line in the manner indicated.

What is claimed is:

1. In combination, a transmission line which is mismatched at both ends, and a matching section in series with the line which section has an alternating current impedance in a desired frequency band which includes the higher frequency components of a steep fronted wave which is substantially equal to the line impedance and a direct current impedance of substantially zero.

2. In combination, a transmission line which is mismatched at its sending end in an impedance which is lower than that of line impedance and which is terminated in its receiving end in an impedance which is substantially higher than the line impedance and which may assume one of a number of possible values; and an impedance matching device in series with the sending end of said line and having an alternating current impedance which is approximately equal to the line impedance in a frequency band which extends from a frequency somewhat higher than the fundamental frequency component of a particular steep fronted wave to a frequency at least several times said fundamental frequency and a direct current impedance of substantially zero.

3. In the combination as set forth in claim 2, said matching section consisting of a resistor and inductor connected in parallel, the value of resistance being slightly higher than the characteristic resistance of the line.

4. In combination, a transmission line which is mismatched at its receiving end in a varying impedance which is always of substantially larger value than the transmission line characteristic impedance and which is substantially short circuited at its sending end; connections for applying a steep fronted wave to said sending end; and a matching section at the sending end of the line having a time constant which is approximately equal to the longer one of the rise time of the steep fronted wave and twice the transmission line delay time, and which has a direct current impedance of substantially zero ohms.

5. In combination, a transmission line which is mismatched at its receiving end in a varying impedance which is always of substantially larger value than the transmission line characteristic impedance and which is substantially short circuited at its sending end; connections for applying a steep fronted wave to said sending end; and a matching section at the sending end of the line consisting of an inductor of the value L and resistor of value R and having a L/R time constant which is approximately equal to the longer one of the rise time of the steep fronted wave and twice the transmission line delay time, and which has a direct current impedance of substantially zero ohms.

6. In combination, a transmission line which is mismatched at its receiving end in a varying impedance which is always of substantially larger value than the transmission line characteristic impedance and which is substantially short circuited at its sending end; connections for applying a steep fronted wave to said sending end; and a matching section at the sending end of the line and in series with the line, said section consisting of a resistor of a value R slightly greater than the characteristic resistance of the line, and an inductor in shunt with the resistor, the inductor value L being such that the L/R time constant is roughly equal to the longer one of the following times: (*a*) the rise time of the steep fronted wave; (*b*) twice the delay time of the transmission line, and said matching section having a direct current resistance.

7. In combination, a transmission line; a driver connected to the sending end of the line for applying a direct current voltage to the line which has a steep leading edge, said driver having an impedance which is much lower than the line impedance, looking from the line into said driver; a plurality of receivers connected in parallel to the receiving end of the line, and each having an impedance, looking into said receiver, when the receiver is in condition to conduct, which is much greater than the line impedance, and the number of said receivers which conduct being variable; and an impedance matching means in series with the line and which has an impedance which looks to the second and higher frequency components of the steep edge of said applied voltage like an impedance substantially equal to the line impedance, and which has a direct current impedance of substantially "zero."

8. In combination, a transmission line; a driver connected to the sending end of the line for applying a direct current voltage to the line which has a steep leading edge, said driver having an impedance which is much lower than the line impedance, looking from the line into said driver; a plurality of receivers connected in parallel to the receiving end of the line, and each having an impedance, looking into said receiver, when the receiver is in condition to conduct, which is much greater than the line impedance, and the number of said receivers which conduct being changeable; and an impedance matching means in series with the line consisting of two parallel branch circuits, one including solely a resistor and the other including solely an inductor, the values of said elements being such that said section has an alternating current impedance at frequencies greater than the fundamental frequency component of the steep fronted wave substantially equal to the line impedance.

9. In combination, a transmission line which is mismatched at its sending end in an impedance which is lower than that of the line impedance and which is terminated in its receiving end in an impedance which is substantially higher than the line impedance and which may assume one of a number of possible values; and an impedance matching device in series with the sending end of said line and having an equivalent alternating current impedance in a desired frequency band which is substantially equal to the line impedance and a direct current impedance of substantially "zero," said device consisting solely of a resistive branch in shunt with an inductive branch.

10. In combination, a transmission line which is mismatched at both ends, and a matching section in series with the line which has an alternating current impedance in a desired frequency band substantially equal to the line impedance and a direct current impedance of substantially "zero," said section consisting of two branches in parallel, one of said branches having solely a resistor and the other of said branches having solely an inductor.

11. In combination, a transmission line which is mismatched at its receiving end in a varying impedance which is always of substantially larger value than the transmission line characteristic impedance and which is substantially short circuited at its sending end; connections for applying a steep fronted wave to said sending end; and a matching section at the sending end of the line having a time constant which is slightly longer than the longer one of the rise time of the steep fronted wave and twice the transmission line delay time, and which has a direct current impedance of substantially zero ohms.

12. In combination, a transmission line which is mismatched at its receiving end in a varying impedance which is always of substantially larger value than the transmission line characteristic impedance and which is substantially short circuited at its sending end; connections for applying a steep fronted wave to said sending end; and a matching section at the sending end of the line consisting of an inductor of value L and resistor of value R and having an L/R time constant which is somewhat longer than the longer one of the rise time of the steep fronted wave and twice the transmission line delay time, and which has a direct current impedance of substantially zero ohms.

13. In combination, a transmission line which is mismatched at its receiving end in a varying impedance which is always of substantially larger value than the transmission line characteristic impedance and which is substantially short circuited at its sending end; connections for applying a steep fronted wave to said sending end; and a matching section at the sending end of the line and in series with the line, said section consisting of a resistor of a value R slightly greater than the characteristic resistance of the line and an inductor in shunt with the resistor, the inductor value L being such that the L/R time constant is slightly longer than the longer one of the following times: (*a*) the rise time of the steep fronted wave; (*b*) twice the delay time of the transmission line, and said matching section having a direct current resistance.

References Cited by the Examiner

UNITED STATES PATENTS

| | | | |
|---|---|---|---|
| 2,768,355 | 10/56 | Nebel | 333—32 |
| 2,772,399 | 11/56 | Jacobsen | 333—20 |
| 2,814,793 | 11/57 | Bonn | 333—30 |
| 2,916,709 | 12/59 | Putzrath | 333—32 |
| 2,957,090 | 10/60 | Hamilton | 307—88.5 |
| 2,971,158 | 2/61 | Bleam | 333—30 |
| 3,073,903 | 6/63 | Cattermole | 179—15 |

HERMAN KARL SAALBACH, *Primary Examiner.*

BENNETT G. MILLER, *Examiner.*